United States Patent
Cahouet et al.

(10) Patent No.: US 9,695,969 B2
(45) Date of Patent: Jul. 4, 2017

(54) ASSEMBLY COMPRISING A FIRST CONDUIT AND A SECOND CONDUIT CONNECTED THROUGH A CONNECTING DEVICE

(71) Applicant: AREVA NP, Courbevoie (FR)

(72) Inventors: Laurent Cahouet, Chaudenay (FR); Frederic Buchot, Epervans (FR)

(73) Assignee: AREVA NP, Courbevoie (FR)

( * ) Notice: Subject to any disclaimer, the term of this patent is extended or adjusted under 35 U.S.C. 154(b) by 979 days.

(21) Appl. No.: 13/774,067

(22) Filed: Feb. 22, 2013

(65) Prior Publication Data

US 2013/0221662 A1 Aug. 29, 2013

(30) Foreign Application Priority Data

Feb. 24, 2012 (FR) ..................................... 12 51723

(51) Int. Cl.
| | | |
|---|---|---|
| *G21C 1/04* | (2006.01) | |
| *F16L 39/00* | (2006.01) | |
| *F16L 19/00* | (2006.01) | |
| *F16L 19/02* | (2006.01) | |
| *F16L 39/06* | (2006.01) | |
| *G01K 1/14* | (2006.01) | |
| *G21C 17/112* | (2006.01) | |
| *G21C 19/16* | (2006.01) | |

(52) U.S. Cl.
CPC .............. *F16L 39/00* (2013.01); *F16L 19/005* (2013.01); *F16L 19/0206* (2013.01); *F16L 39/06* (2013.01); *G01K 1/14* (2013.01); *G21C 17/112* (2013.01); *G21C 19/16* (2013.01)

(58) Field of Classification Search
CPC .............................. G21C 17/10; G21C 17/116
See application file for complete search history.

(56) References Cited

U.S. PATENT DOCUMENTS 2,438,679 A * 3/1948 Parker ..................... F16L 39/00
285/124.2
3,827,935 A * 8/1974 Gruner et al. ........ F16L 15/008
376/245

FOREIGN PATENT DOCUMENTS

| EP | 0 292 164 | 11/1988 |
| FR | 1479524 | 5/1967 |

OTHER PUBLICATIONS

Search Report from foreign parent application FR 12 51723.

* cited by examiner

*Primary Examiner* — Marshall O'Connor
(74) *Attorney, Agent, or Firm* — Davidson, Davidson & Kappel, LLC

(57) ABSTRACT

An assembly is provided that includes at least one first conduit and at least one second conduit connected together through a connecting device. The connecting device includes an exteriorly threaded tube; a connecting part attached to one end of the tube and including an orifice; a holding nut screwed onto the tube and axially maintaining the connecting part relative to a tube; and a retaining member attached on the holding nut and engaging with the first conduit so as to axially retain the first conduit fitted into the orifice, the retaining member cooperating with the first conduit so as to oppose the unscrewing of the holding nut.

20 Claims, 3 Drawing Sheets

ASSEMBLY COMPRISING A FIRST CONDUIT AND A SECOND CONDUIT CONNECTED THROUGH A CONNECTING DEVICE

This application claims priority to French Patent Application 12 51723, filed on Feb. 24, 2012, the entire disclosure of which is hereby incorporated by reference herein.

The present invention relates to a first conduit and a second conduit connected through a connecting device, in particular a first thermocouple guiding conduit and a second thermocouple guiding conduit of a nuclear reactor connected through a supporting plate of the nuclear reactor.

BACKGROUND

Pressurized water reactors (or PWR reactors) include a vessel and inside the vessel, a nuclear reactor core consisting of fuel assemblies and pieces of internal equipment.

The pieces of internal equipment support the fuel assemblies in the core, ensuring their position and allowing control of the nuclear reaction and extraction of heat.

The pieces of internal equipment comprise upper pieces of internal equipment located above the core and lower pieces of internal equipment located below the core.

The upper pieces of internal equipment include an upper core plate in contact on the upper ends of the fuel assemblies, a supporting plate positioned above the upper core plate while being spaced apart from the latter, and spacer columns extending vertically between the upper core plate and the supporting plate.

The upper pieces of internal equipment comprise cluster guides for guiding the control clusters comprising absorbing pencils containing a neutron absorbing material. The cluster guides extend vertically between the upper core plate and the supporting plate and extend above the supporting plate. In order to control the nuclear reaction, the control clusters are moved vertically so that their absorbing pencils are introduced over a more or less substantial height inside certain fuel assemblies.

The upper pieces of internal equipment comprise conduits for guiding the insertion of thermocouples inside the vessel in order to measure the temperature of the water coolant at the outlet of an assembly of pre-selected fuel assemblies.

SUMMARY OF THE INVENTION

It is possible to provide upper guiding conduits each extending between the lid and the supporting plate, and lower guiding conduits each extending between the supporting plate and the upper core plate, each upper guiding conduit being connected to a lower guiding conduit through the supporting plate.

The thermocouples and guiding conduits are subject to a particularly aggressive environment upon considering the nuclear reaction and the high temperatures prevailing in the vessel of the nuclear reactor and the presence of water. Further, there exists a risk of damaging the guiding conduits during maintenance operations of the nuclear reactor, for example requiring replacement of an upper guiding conduit.

Also, it is desirable to be able to easily connect an upper guiding conduit to a lower guiding conduit.

One of the objects of the invention is to propose an assembly comprising a first conduit and a second conduit connected through a connecting device which is simple, reliable and which may be applied easily.

For this purpose, the invention proposes an assembly comprising at least one first conduit and one second conduit connected together through a connecting device comprising:
  an exteriorly threaded tube extending along a tube axis, the second conduit extending inside the tube;
  a connecting part attached to one end of the tube, the connecting part extending along the axis of the tube and being angularly indexed relatively to the tube, the first conduit being fitted into an orifice which axially crosses the connecting part;
  a holding nut screwed onto the tube and axially holding the connecting part relatively to the tube, the holding nut comprising a tapped annular nut body; and
  a retaining member attached on the nut body and engaging with the first conduit so as to axially retain the first conduit fitted into the orifice, the retaining member cooperating with the first conduit so as to oppose the unscrewing of the holding nut.

According to other embodiments, the assembly comprises one or more of the following features, taken individually or according to all the technically possible combinations:
  the orifice is off-centered relatively to the tube axis;
  the second conduit is fitted into the orifice, the first conduit and the second conduit being each fitted at one respective end of the orifice;
  it comprises a plug closing the tube, the second conduit axially passing through the plug while being off-centered relatively to the axis of the tube;
  it comprises several first conduits and several second conduits, the connecting part comprising a respective orifice for each first conduit, each orifice being off-centered relatively to the tube axis;
  it comprises three first conduits and three orifices which, in an axial view, are angularly distributed uniformly around the tube axis.
  the retaining member is attached, for example by screwing, in an attachment hole made in the nut body;
  the nut body comprises several angularly distributed attachment holes;
  the retaining member comprises a base attached on the nut body and at least one arm extending from the base radially inwards relatively to the tube axis and engaging with the first conduit so as to axially retain it and to cooperate with the first conduit so as to oppose any unscrewing of the retaining nut;
  the retaining member comprises two arms:
  the arms in an axial view pass on either side of the or each first conduit, the each first conduit being received between both arms;
  the first conduit comprises a flange protruding radially outwards, the retaining member cooperating with the flange in order to axially retain the first conduit fitted into the orifice;
  it forms a thermocouple guiding device of a nuclear reactor, each conduit defining a thermocouple guiding conduit;
  the tube is a spacer column of a nuclear reactor.

A connecting device is also provided for an assembly as defined above and to a nuclear reactor comprising such an assembly.

BRIEF SUMMARY OF THE DRAWINGS

The invention and advantages thereof will become better understood upon reading the description which follows, only given as an example, and made with reference to the appended drawings wherein.

DETAILED DESCRIPTION

Figure 1:
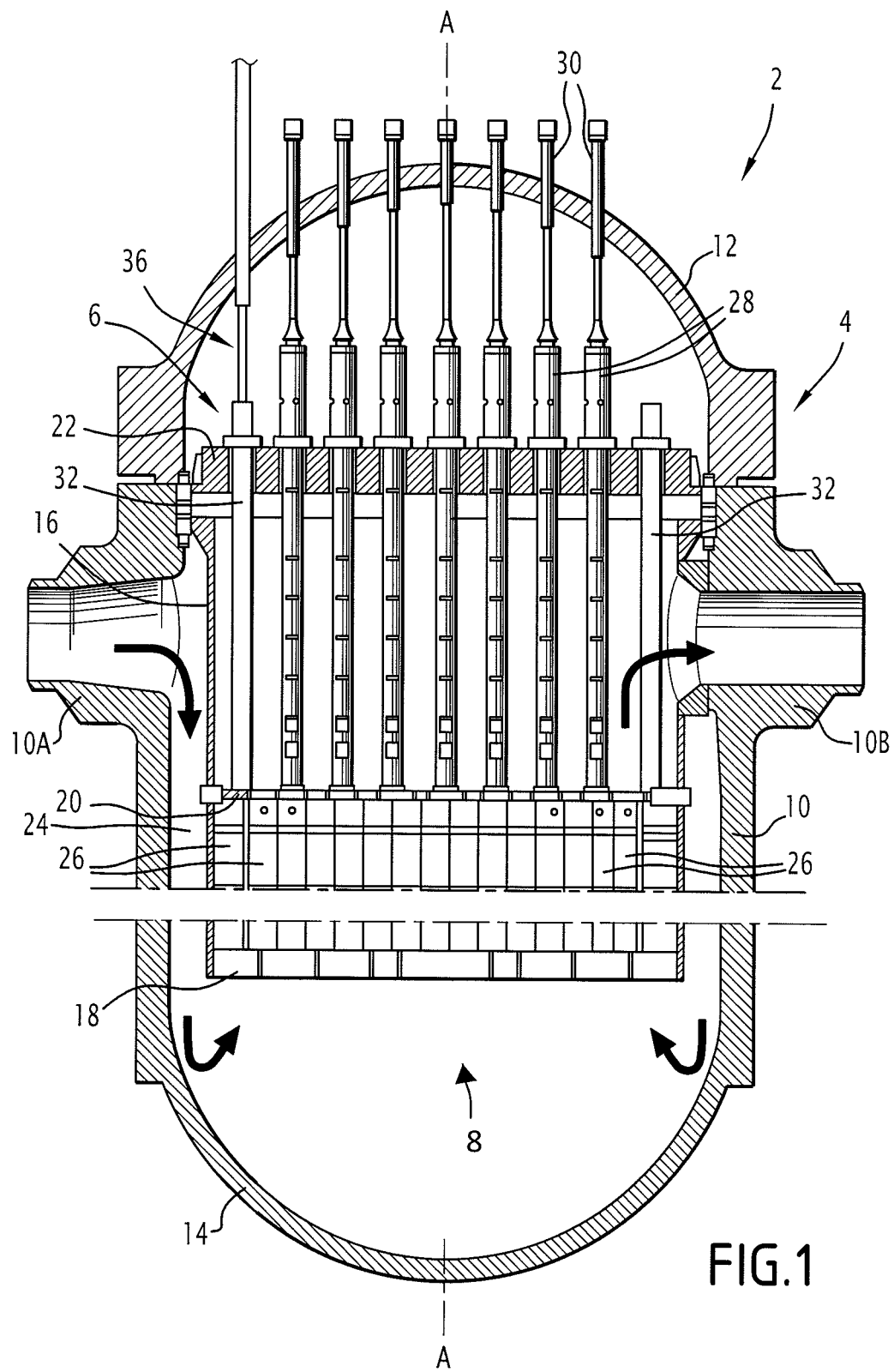
FIG. 1 is a schematic sectional view of the upper portion of a nuclear reactor comprising a thermocouple guiding device.

As illustrated in FIG. 1, the nuclear reactor 2 comprises a vessel 4 and a reactor core 6 and pieces of internal equipment 8 positioned inside the vessel 4.

The vessel 4 comprises a tubular vessel body 10 extending along a vessel axis A-A, a hemispherical vessel lid 12 closing the axial upper end of the vessel body 10, and a hemispherical vessel bottom 14 closing the lower axial end of the vessel body 10.

The pieces of internal equipment 8 comprise a tubular core shell 16 coaxial with the vessel body 10 and a lower core plate 18, an upper core plate 20 and a supporting plate 22 each extending through the core shell 16 while being axially spaced apart along the vessel axis A-A.

The core shell 16 delimits with the vessel body 10 an annular intermediate space 24.

The vessel body 10 comprises an inlet manifold 10A for the entry of the fluid coolant and an outlet manifold 10B for the outflow of the fluid coolant. The inlet manifold 10A opens into the annular intermediate space 24 delimited between the vessel body 10 and the core shell 6. The outlet manifold 10B is fed inside the core shell 6.

The lower core plate 18 is positioned at the lower end of the core shell 16. The supporting plate 22 is positioned at the upper end of the core shell 16. The upper core plate 20 is axially positioned between the lower core plate 18 and the supporting plate 22.

The lower core plate 18 and the upper core plate 20 are openworked in order to allow circulation of the fluid coolant through the latter. The supporting plate 22 closes the upper end of the core shell 16.

The reactor core 6 comprises an assembly of fuel assemblies 26 with an elongated prismatic shape, positioned vertically inside the core shell 6, between the lower core plate 18 which supports them and the upper core plate 20 which retains them.

During operation, the fluid coolant brought by the inlet manifold 10A axially circulates downwards in the intermediate space 24 and then axially flows upwards inside the core shell 16 by successively passing through the lower core plate 18, the reactor core 4 and the upper core plate 20, and then flows out again through the outlet manifold 10B.

The pieces of internal equipment 8 comprise cluster guides 28 extending vertically between the upper core plate 20 and the supporting plate 22 and pass through the supporting plate 22 and extending above the latter.

The pieces of internal equipment 8 comprise cluster mechanisms 30 extending vertically upwards from the cluster guides 28 and passing through the lid 12, in order to control the displacement of the control clusters from the outside of the vessel 4.

The pieces of internal equipment 8 comprise spacer columns 32 extending between the upper core plate 20 and the supporting plate 22 in order to maintain their distance of separation.

The pieces of internal equipment 8 comprise guiding devices 36 for inserting thermocouples inside the vessel 4, as far as the reactor core 6, in order to measure the temperature of the fluid coolant at the outlet of the fuel assemblies 26.

Each guiding device 36 gives the possibility of guiding one or more thermocouples through the lid 12 and the supporting plate 22, as far as the upper core plate 20.

The guiding devices 36 are similar. A guiding device 36 will now be described in more detail with reference to FIGS. 2 and 3.

Figure 2:
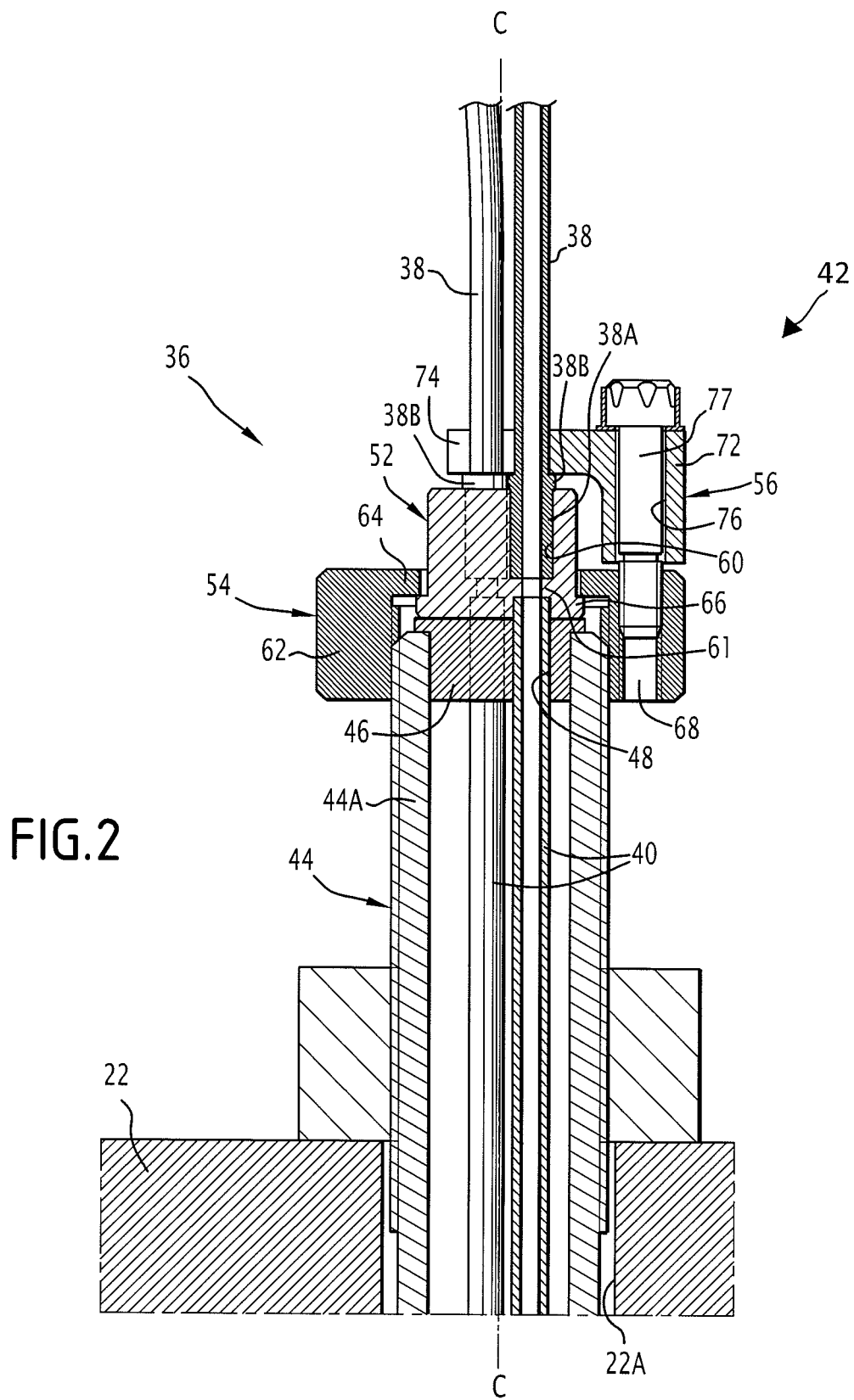
FIG. 2 is an axial sectional view of the thermocouple guiding device.

As illustrated in FIG. 2, the guiding device 36 comprises at least one first conduit or upper guiding conduit 38 and at least one second conduit or lower guiding conduit 40, and a connecting device 42 connecting each upper guiding conduit 38 to a respective lower guiding conduit 40.

In the illustrated example, the guiding device 36 comprises three upper guiding conduits 38 and corresponding lower guiding conduits 40 connected pairwise.

Each upper guiding conduit 38 extends above the supporting plate 22 between the lid 12 and the supporting plate 22. Each lower guiding conduit 40 extends below the supporting plate 22, between the supporting plate 22 and the upper core plate 20. Each upper guiding conduit 38 is connected to the lower guiding conduit 40 through the supporting plate 22.

The connecting device 42 comprises a tube 44 extending along a tube axis C-C. The tube 44 passes through the supporting plate 22 and comprises a threaded end 44A protruding from the supporting plate 22 upwards. The tube 44 passes through an aperture 22A of the supporting plate 22. The tube 44 may be a tubular spacer column.

The connecting device 42 comprises a plug 46 closing the end 44A of the tube 44. The lower guiding conduits 40 extend axially inside the tube 44 and open out on the outside of the tube 44 by passing through the plug 46. Each lower guiding conduit 40 comprises a connecting end 40A protruding from the plug 46 on the outside of the tube 44.

The plug 46 is provided with axial passage holes 48 passing through the plug 46. Each lower guiding conduit 40 extends into a respective passage hole 48. The plug 46 comprises a respective passage hole 48 for each lower guiding conduit 40.

The plug 46 is positioned at the end 44A of the tube 44 while being indexed in rotation around the tube axis C-C relatively to the tube 44. Preferably, the plug 46 is attached so as to be immobile on the end 44A of the tube. The plug 46 is for example force-fitted into the end 44A of the tube 44 and/or welded on the latter.

Each lower guiding conduit 40 is off-centered relatively to the tube axis C-C. In the illustrated example, the lower guiding conduits 40, three in number, are angularly distributed uniformly around the tube axis C-C at 120°. They are positioned at the apices of an imaginary isosceles triangle centered on the tube axis C-C.

The connecting device 42 comprises a connecting part 52 positioned at the end 44A of the tube 44, a holding nut 54 for holding the connecting part 52 secured to the end 44A of the tube 44, and a retaining member 56 attached on the nut 54 and intended to axially retain the upper guiding conduits 40 fitted into the connecting part 52 and for cooperating with the upper guiding conduits 40 for opposing the unscrewing of the holding nut 54.

The connecting part 52 extends along the tube axis C-C and comprises orifices 60 axially passing through the connecting part 58.

Each orifice 60 is off-centered relatively to the tube axis C-C. In the illustrated example, the orifices 60 are three in number and angularly distributed uniformly around the tube axis C-C at 120°. They are positioned at the apices of an imaginary isosceles triangle centered on the tube axis C-C.

Each upper guiding conduit 38 has a connecting end 38A fitted into a respective orifice 60, at the end of the orifice 60 opposite to the tube 44.

Each lower guiding conduit 40 has its connecting end 40A protruding from the plug 46 fitted into a respective orifice 60, at the end of the orifice 60 adjacent to the tube 44.

Thus, each upper guiding conduit 38 is connected to a respective lower guiding conduit 40 in an orifice 60 of the connecting part 52.

In each orifice 60, the connecting ends 38A, 40A of the upper guiding conduit 38 and of the lower guiding conduit 40 fitted into the orifice 60 will axially bear against the radial shoulders defined inside the orifice 60 by an annular rib 61 forming a constriction in the orifice 60.

The connecting part 52 is indexed in rotation around the tube axis C-C relatively to the tube 44.

Each lower guiding conduit 40 is set relatively to the tube 44. Each lower guiding conduit 40 fitted into an off-centered orifice 60, indexes the connecting part 52 angularly around the tube axis C-C relatively to the tube 44.

The holding nut 54 is screwed onto the end 44A of the tube 44. The holding nut 54 comprises a tapped annular nut body 62 comprising an internal threading mating the external threading of the end 44A of the tube 44.

The holding nut 54 holds the connecting part 52 axially against the end 44A of the tube 40.

To do this, the holding nut 54 comprises an internal edge 64 protruding radially inwards from the nut body 62 and engaging axially with a holding flange 66 of the connecting part 52 protruding radially outwards.

The holding nut 54 comprises at least one tapped attachment hole 68 extending axially inside the nut body 62, preferably several attachment holes 68 distributed angularly around the tube axis C-C.

The retaining member 56 comprises a yoke 70 having a base 72 extending axially and two arms 74 extending transversely from the base 72. The base 72 is tubular and provided with a bore 76.

The base 72 is attached on the nut body 62 by a screw 77 axially passing through the bore 76 of the base 72 and screwed into an attachment hole 68 of the nut body 62.

The base 72 is attached on the nut body 62 off-centered relatively to the tube axis C-C and is oriented so that the arms 74 extend from the base 72 radially inwards relatively to the tube axis C-C.

Both arms 74 pass above the connecting part 52 which is thus axially located along the tube axis C-C between the end 44A of the tube 44 and the arms 74.

Figure 3:
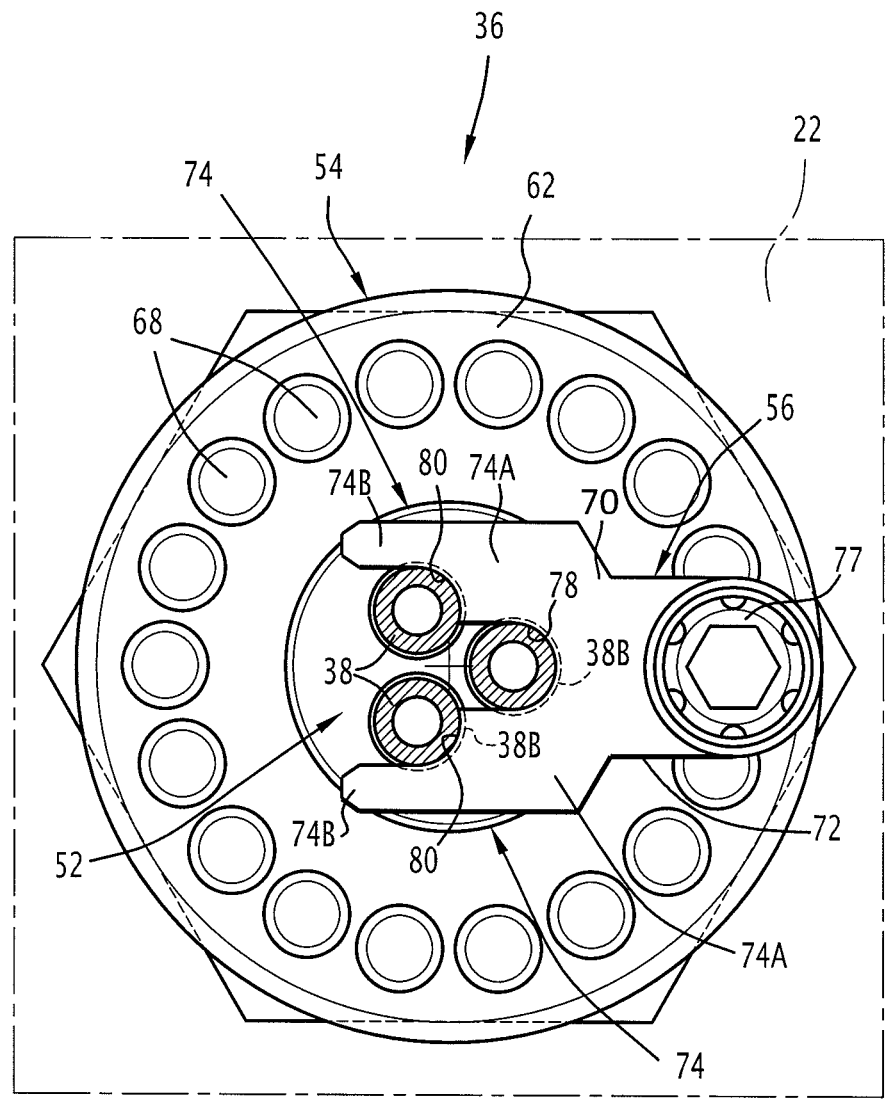
FIG. 3 is a top view of the guiding device of FIG. 2.

As illustrated in FIG. 3, in an axial view, both arms 74 extend on either side of the upper guiding conduits 42. The upper guiding conduits 42, here three in number, are received and pass between the arms 74.

The arms 74 will axially engage with the upper guiding conduit 38 fitted into the orifices 60 for opposing extraction of the upper guiding conduits 38 from the orifices 60 of the connecting part 52.

To do this, each upper guiding conduit 38 comprises an annular holding flange 38B protruding radially outwards. The arms 74 are axially engaged with the holding flanges 38B of the upper guiding conduits 38.

Each arm 74 comprises a proximal portion 74A near the base 72 and a distal portion 74B away from the base 72.

An upper guiding conduit 38 is received in a first notch 78 defined in the bottom of the yoke 70 between the arms 74 and is axially retained by the proximal portions 74A of the arm 74. The notch 78 in an axial view has a circular arc profile, here a half circle, following the external surface of the upper guiding conduit 38.

Each of the two other upper guiding conduits 38 is axially retained by the distal portion 74B of a respective arm 74. Each distal portion 74B comprises a second notch 80 for receiving the upper guiding conduit 38 having, in an axial view, a circular arc profile following the external surface of the upper guiding conduit 38, preferably a quarter circle profile.

The retaining member 56 cooperates with the upper guiding conduit 38 so as to oppose the unscrewing of the holding nut 54.

A movement of rotation of the holding nut 54 around the column axis C-C in the direction of unscrewing (arrow D in FIG. 3) causes an axisymmetrical movement of the retaining member 56 around the tube axis C-C which is prevented by the arms 74 engaged with the upper guiding conduit 38. It will be noted that the retaining member 56 also opposes additional unscrewing of the nut 54.

The guiding device 36 forms an assembly which is easy to assemble, in particular from a distance, under water, by means of poles without requiring emptying of the water of the reactor.

The plug 46 and the lower guiding conduits 40 are permanently attached to the inside of the tube 44. The upper guiding conduits 38 are easily connected by installing the connecting part 52 at the end 44A of the tube 44, and then by screwing the holding nut 54 on the end 44A in order to axially retain the connecting part 52, and then by fitting the upper guiding conduits 38 into the orifices 60, and then by attaching the retaining member 56 so that it holds the upper guiding conduits 38, fitted into the orifices 60 and opposes the unlocking of the holding nut 54 by cooperating with the upper guiding conduits 38.

The guiding device 36 forms a reliable assembly, notably by the retaining member giving the possibility of retaining the upper guiding conduits, fitted into the connecting part 52, and further opposes unlocking of the nuts 54, by cooperating for this purpose with the upper guiding conduits 38.

The guiding device 36 forms an assembly consisting of simple parts which are easy to manufacture.

In the embodiment of FIGS. 2 and 3, the tube 44 is a spacer column, the first conduits (upper guiding conduits) being connected through the connecting device 50 to the second conduits (lower guiding conduits) at an axial end of the spacer column. Alternatively, the tube is a specific tapping tube passing through the supporting plate 22 without forming a spacer column.

The invention is not limited to a device for guiding thermocouples of a nuclear reactor. More generally, the invention relates to an assembly comprising at least one first conduit and one second conduit and a device for connecting the first conduit to the second conduit according to the invention.

What is claimed is:

1. A nuclear reactor comprising:
   an assembly comprising:
      at least one first conduit and at least one second conduit; and
      a connecting device connecting the at least one first conduit and one second conduit together, the connecting device comprising:
         an exteriorly threaded tube extending along a tube axis, the second conduit extending inside the tube;
         a connecting part attached to one end of the tube, the connecting part extending along the tube axis and being angularly indexed relative to the tube, the first conduit being fitted into an orifice which axially passes through the connecting part;

a holding nut screwed onto the tube and axially holding the connecting part relative to the tube, the holding nut comprising a tapped annular nut body; and a retaining member removably attached on the nut body and engaging with the first conduit so as to axially retain the first conduit fitted into the orifice, the retaining member cooperating with the first conduit so as to oppose the unlocking of the holding nut.

2. The nuclear reactor as recited in claim 1 wherein the orifice is off-centered relative to the tube axis.

3. The nuclear reactor as recited in claim 1 wherein the second conduit is fitted into the orifice, the first conduit and the second conduit being each fitted at one respective end of the orifice.

4. The nuclear reactor as recited in claim 1 wherein the connecting device comprises a plug closing the tube, the second conduit axially passing through the plug while being off-centered relative to the axis of the tube.

5. The nuclear reactor as recited in claim 1 wherein the at least one first conduit includes multiple first conduits and the at least second conduit includes multiple second conduits, the connecting part comprising a respective orifice for each first conduit, each orifice being off-centered relative to the tube axis.

6. The nuclear reactor as recited in claim 5 wherein the multiple first conduits include three first conduits and the orifices include three orifices which, in an axial view, are angularly distributed uniformly around the tube axis.

7. The nuclear reactor as recited in claim 1 wherein the retaining member is set, by screwing, in an attachment hole made in the nut body.

8. The nuclear reactor as recited in claim 7 wherein the nut body comprises multiple angularly distributed attachment holes.

9. The nuclear reactor as recited in claim 1 wherein the retaining member comprises a base attached on the nut body and at least one arm extending from the base radially inwards relative to the tube axis and directly engaging with the first conduit so as to axially retain the first conduit and to cooperate with the first conduit so as to oppose the unscrewing of the holding nut.

10. The nuclear reactor as recited in claim 9 wherein the retaining member comprises two arms.

11. The nuclear reactor as recited in claim 10 wherein the arms in an axial view, pass on either side of the at least one first conduit, the at least one first conduit being received between both arms.

12. The nuclear reactor as recited in claim 1 wherein the first conduit comprises a flange protruding radially outwards, the retaining member cooperating with the flange for axially retaining the first conduit fitted into the orifice.

13. The nuclear reactor as recited in claim 1 wherein the assembly forms a thermocouple guiding device for a nuclear reactor, each conduit defining a thermocouple guiding conduit.

14. The nuclear reactor as recited in claim 1 wherein the tube is a spacer column of a nuclear reactor.

15. The nuclear reactor as recited in claim 1 wherein the retaining member is removably attached on the nut body by a fastener passing through the retaining member and into the holding nut.

16. The nuclear reactor as recited in claim 5 wherein at least one arm of the retaining member contacts a partial circumferential extent of an outer diameter surface of each of the first conduits.

17. The nuclear reactor as recited in claim 1 wherein the connecting part is held axially between at least one arm of the retaining member and the end of the tube.

18. The nuclear reactor as recited in claim 1 where a base of the retaining member is axially aligned with a portion of the holding nut and is offset radially outward with respect to the connecting part.

19. A nuclear reactor comprising:
an assembly comprising:
at least one first conduit and at least one second conduit; and
a connecting device connecting the at least one first conduit and one second conduit together, the connecting device comprising:
an exteriorly threaded tube extending along a tube axis, the second conduit extending inside the tube;
a connecting part attached to one end of the tube, the connecting part extending along the tube axis and being angularly indexed relative to the tube, the first conduit being fitted into an orifice which axially passes through the connecting part;
a holding nut screwed onto the tube and axially holding the connecting part relative to the tube, the holding nut comprising a tapped annular nut body; and
a retaining member attached on the nut body and engaging with the first conduit so as to axially retain the first conduit fitted into the orifice, the retaining member cooperating with the first conduit so as to oppose the unlocking of the holding nut, the retaining member being axially offset from the holding nut and the tube.

20. A nuclear reactor comprising:
an assembly comprising:
at least one first conduit and at least one second conduit; and
a connecting device connecting the at least one first conduit and one second conduit together, the connecting device comprising:
an exteriorly threaded tube extending along a tube axis, the second conduit extending inside the tube;
a connecting part attached to one end of the tube, the connecting part extending along the tube axis and being angularly indexed relative to the tube, the first conduit being fitted into an orifice which axially passes through the connecting part;
a holding nut screwed onto the tube and axially holding the connecting part relative to the tube, the holding nut comprising a tapped annular nut body; and
a retaining member attached on the nut body and engaging with the first conduit so as to axially retain the first conduit fitted into the orifice, the retaining member cooperating with the first conduit so as to oppose the unlocking of the holding nut,
wherein the retaining member comprises a base attached on the nut body and at least one arm extending from the base radially inwards relative to the tube axis to be partially axially aligned with an interior of the tube and engaging with the first conduit so as to axially retain the first conduit, the engagement of the at least one arm with the first conduit preventing the unscrewing of the holding nut.

\* \* \* \* \*